United States Patent [19]

Crimmins

[11] Patent Number: 4,553,267
[45] Date of Patent: Nov. 12, 1985

[54] INFRARED TELEPHONE EXTENSION MODULATION SYSTEM

[76] Inventor: James W. Crimmins, 15 Nutmeg La., Wilton, Conn. 06897

[21] Appl. No.: 288,735

[22] Filed: Jul. 31, 1981

[51] Int. Cl.[4] ............................................. H04B 9/00
[52] U.S. Cl. .................................. 455/606; 455/614; 179/2 EA
[58] Field of Search ............... 455/608, 606, 607, 617, 455/614, 613; 179/2 EA

[56] References Cited

U.S. PATENT DOCUMENTS

| 3,488,586 | 1/1970 | Watrous | 455/613 |
|---|---|---|---|
| 3,644,681 | 2/1972 | Rice | 179/41 A |
| 3,927,316 | 12/1978 | Citta | 455/619 |
| 4,068,093 | 1/1978 | Fidi | 179/1 GP |
| 4,081,747 | 3/1978 | Meyerle | 343/248 |
| 4,221,932 | 9/1980 | Angilkowski | 179/2 EA |
| 4,228,320 | 10/1980 | Celli | 179/2 EA |
| 4,241,236 | 12/1980 | Nash | 179/2 EA |
| 4,259,746 | 3/1981 | Sandstedt | 455/612 |
| 4,317,234 | 2/1982 | Kunde et al. | 455/606 |
| 4,450,319 | 5/1984 | Lucey | 179/2 EA |

FOREIGN PATENT DOCUMENTS

| 2823931 | 12/1979 | Fed. Rep. of Germany | 455/608 |
|---|---|---|---|
| 1543722 | 4/1979 | United Kingdom | 455/613 |
| 1548145 | 7/1979 | United Kingdom . | |

OTHER PUBLICATIONS

E. Braun et al, "A Cordless Infrared Telephone" May-1980, *Telecom Report* 3 (1980) No. 2, pp. 83-86.

*Primary Examiner*—Edward L. Coles, Sr.
*Attorney, Agent, or Firm*—Weingarten, Schurgin, Gagnebin & Hayes

[57] ABSTRACT

A portable telephone or other signaling system features a remote or portable unit responsive to operator voice and control signals to modulate infrared emitting diodes with narrowband, FM low duty cycle pulses which are received by a telephone network unit operative to demodulate the infrared signals, control the telephone network connection and to transmit and receive voice signals from the network. The portable unit utilizes narrowband FM pulse modulation to optimize the use of battery power. The portable unit further includes means for transmitting on-and-off hook indicia and dialing pulses with the same efficient, narrowband FM pulse modulation. The network base unit includes infrared receiving and decoding means in order to identify audio signals and apply them to the telephone network as well as to detect dial pulses and on-and-off hook indicia to process them for connecting and disconnecting the network unit to the telephone network. Audio signals from the telephone network are sent via a loudspeaker in the network unit to the region of the remote unit along with ring signals.

8 Claims, 3 Drawing Figures

INFRARED TELEPHONE EXTENSION MODULATION SYSTEM

FIELD OF THE INVENTION

The present invention relates to portable signaling systems and in particular to portable signaling systems using infrared signaling emissions.

BACKGROUND OF THE INVENTION

Portable signaling systems such as telephone systems utilizing radio links between a portable unit and a base unit connected to the telephone network have been known for some time. As a need for providing privacy in such telephone usage has increased, the infrared band was developed in order to limit the distribution of signals from the portable unit. Such infrared emissions, typically from infrared emitting diodes, were limited to line of sight communications or confined to a single room where infrared reflections from walls and ceilings can extend the range beyond line of sight.

While techniques are known for modulating such infrared emitters, there exists a need for a battery conserving, modulation technique which provides both ample range to the portable unit for convenience and movement about the room as well as battery longevity. In addition, a system is required which couples efficient modulation techniques with a complete system for on- and off-hook control of the system operation in conjunction with conventional keyboard dialing from the portable unit.

BRIEF SUMMARY OF THE INVENTION

In accordance with the teaching of the present invention a portable, infrared based telephone system is presented in which modulation of infrared emissions from a remote unit is provided in a highly efficient preferably narrowband FM pulse system. The pulses are low duty cycle to improve the received signal to noise ratio for a given transmitter average power drain. The remote unit combines transmission of FM pulse modulated on- and off-hook indicia with keyboard pulse signals and normal audio voice signals. A fixed, network connected base unit provides decoding of the audio, dial and on/off hook signals to provide appropriate network control and transmissions. It further includes a loudspeaker for broadcasting network audio signals and ring indicia in listening range of the remote unit.

The narrowband, FM modulation utilizes a limited frequency excursion about a central frequency. The resulting zero crossings of varying spacing are utilized to produce voltage pulses of controlled duration across an inductor. This generates in the inductor a large current which is subsequently switched through a series of infrared emitting diodes to provide a voltage increase that excites the diodes to emit while limiting battery requirements. A control tone of first and second durations is utilized to provide on- and off-hook indicia respectively while dial pulses are represented by extreme frequency deviations at the dial pulse frequency in the narrowband FM modulation frequency. The fixed unit responds to the various indicia to provide control over the interconnection with the telephone network as well as for distinguishing between audio signals applied to the network and pulse signals applied as conventional circuit interrupts for dialing.

DESCRIPTION OF THE DRAWING

These and other features of the present invention are more fully setforth below in the solely exemplary detailed description of the invention and in the accompanying drawings of which.

DETAILED DESCRIPTION

The present invention contemplates a portable signaling system such as a telephone system utilizing a remote unit having efficiently modulated infrared emitting diodes operating in the FM low duty cycle pulse mode in response to audio, dial and control signals in conjunction with a network associated base unit operative to receive and decode signals from the remote unit and to control the telephone network therewith.

Figure 1:
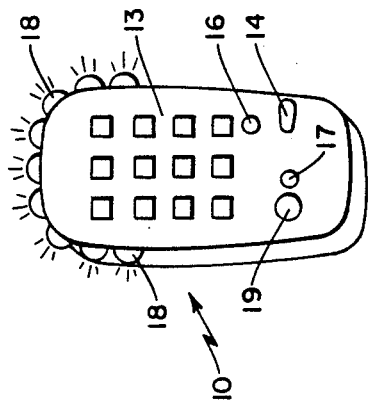
FIG. 1 is a representative pictorial view of remote and base units for use in the present invention.

FIG. 1 illustrates both the remote, typically portable, unit 10 and the network associated base unit 12. The portable unit 10 contains a standard keyboard 13 as typically found on dial units of the Bell Telephone System. The unit 10 includes a three positioned control switch 14 the function of which is described below as well as a lamp 16 for indicating an on state. A microphone 17 is provided to receive voice signals and a muting switch 19 is operative to disable microphone inputs. An array of light emitting diodes 18 is provided about the periphery of the unit 10 in order to emit infrared radiation over a broad angle for reception by receiving diodes 20 on the network unit 12. The network unit 12, typically wall mounted, includes a four wire connection 22 to the telephone network. A two wire connection, standard in the telephone system may be used instead. The second pair is used here for illustrating a PBX hook up. The network system 12 additionally includes a loudspeaker 24 which is utilized to broadcast signals received on the network 22 to the environment, typically the same room, containing the portable unit 10.

Figure 2:
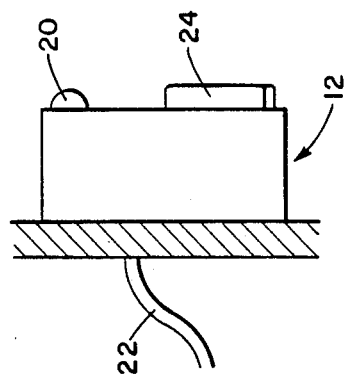
FIG. 2 is a circuit diagram of the portable unit system of the present invention.
Figure 2:
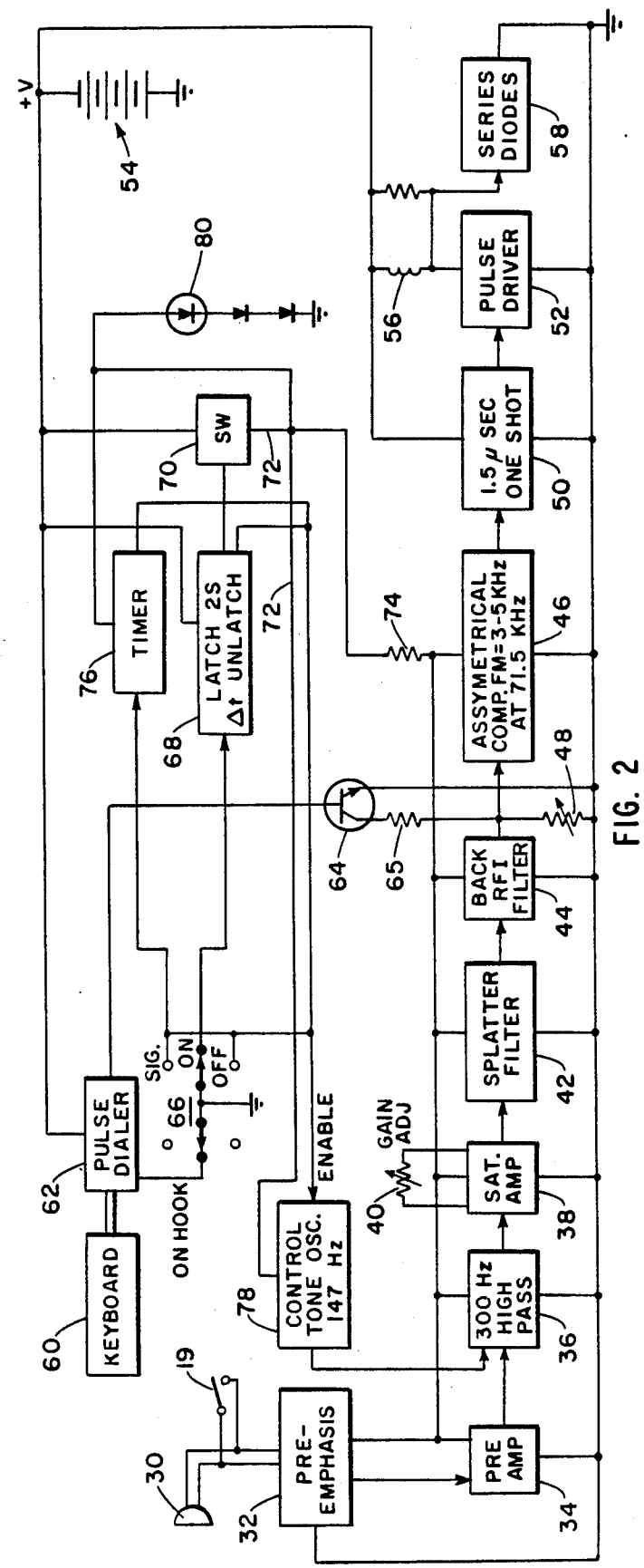

Circuitry contained within the portable unit 12 is illustrated in the circuit diagram of FIG. 2. As shown there a microphone 30 (microphone 17) has its output signal applied to a pre-emphasis network 32 which provides a 6 db per octave pre-emphasis above 300 Hz. This pre-emphasized signal is applied through a preamplifier 34 to a 300 Hz high-pass filter 36. Filter 36 attenuates frequencies corresponding to the frequency of control tone signals to be described below. The output of the high-pass filter 36 is applied through a saturating amplifier 38 having a gain adjustment 40 to a splatter filter 42. The purpose of the saturating amplifier 38 is to limit the amplitude excursions of the signal in order to control the FM frequency deviation in the modulation to be described below. The splatter filter 42 acts as a low-pass filter on the output of the saturating amplifier to avoid the passage of transients from the limiting function. The output of the splatter filter 42 is applied to an RF interference filter 44 the output of which is applied to an asymmetrical oscillator 46. The RFI filter 44 prevents RF signals from passing back from the oscillator 46 toward the low frequency components of the signal chain.

The asymmetrical oscillator 46 includes a comparator such as an LM393 operating as an oscillator at 71.5 kHz with a variable resistor 48 across its inverting input to provide an asymmetrical waveform in its square wave output. This asymmetry permits the audio signal applied to the inverting input from the RFI filter 44 to vary the frequency of the comparitor's oscillations. Typically the frequency variation is set for approximately 3 to 5 kHz about the 71.5 kHz carrier frequency set by resistor 48. Oscillator 46 is typically operated in a narrowband FM mode.

The output of the oscillator 46 is applied to a one-shot multivibrator 50 having, for example, a pulse of 1.5 microseconds duration coincident with each falling edge from the oscillator 46. The 1.5 microsecond duratin of the pulse from the one-shot circuit 50 defines a imited or low duty cycle on-time for the battery power used to charge the inductor which in turn activates the infrared emitting diodes for efficient FM operation.

For this purpose, the output of the one-shot multivibrator 50 is applied to a pulse driver 52 consisting of a single transistor stage which, during each 1.5 microsecond pulse, conducts current from a supply battery 54 through an inductor 56. This builds up a high current within the inductor 56 which, at the termination of the pulse, results in the application of a high voltage across series connected infrared emitting diodes 58. The high voltage is produced by the inductive effect of the current stored in the inductor 56 returning to zero in a short time. It is therefor important that the time constant of the current discharge circuit be low, preferably less than the time for current build up. In this manner a series connection of eight diodes in the module 58 can be triggered with a sufficiently high voltage using a supply voltage of, for example, only five volts. The short pulse activation provided by the 1.5 microsecond current pulse induced by pulse driver 52 and inductor 56 provides efficient utilization of the power in battery 54 converting it, through inductive current switching, to a high diode energizing voltage.

The timing of each pulse of voltage applied through the diodes 58 varies in accordance with the pulse spacing resulting from the narrowband FM modulation initially produced in the oscillator 46. By current driving the diodes 58, the variation in their voltage-current relationship on power output is minimized and in effect the system becomes self regulating in power output.

The short duty cycle to the pulses, typically 14% in the example, insures efficient use of transmitter battery power. This results from the fact that the receiving diodes output current is proportional to received infrared power whereas the receiver power output varies with the duty cycle and square of the diode current. Under these conditions, reducing the duty cycle while maintaining the same average transmitter power improves receiver signal to noise ratio.

Dial pulse signals are also modulated with the same efficient, narrowband FM characteristics to provide infrared emission by the series diodes 58. A three-by-four matrix keyboard 60 is used in conjunction with a pulse dialer 62 such as a Mostek MK50992N or AMI S2560A. The desired exchange numbers identified by activation of the keyboard 60 are stored in the pulse dialer 62, when activated as described below. The pulse dialer 62 transmits the stored pulses at a predetermined rate in accordance with telephone network requirements and applies them to a transistor 64 which is coupled across the input of the oscillator 46. Transistor 64 is normally on and connects a resistor 65 across resistor 48 which together determine the frequency of oscillator 46. Pulses from dialer 62 open transistor 64 and force the oscillator 46 to an extreme excursion in its FM modulation frequency swing at the dial pulse rate for the duration of each pulse, providing a clear indication of the pulse for demodulation at the network unit 12 as described below. Rather than use a dial pulse dial system, pulse coded digital words could be transmitted as well.

The pulse dialer 62 is activated to respond to the output of the keyboard 60 and apply pulses to the transistor 64 by a switch 66 which, in the "on" condition, grounds the on-hook terminal of the pulse dialer 62. The switch 66, in the "on" condition also activates a latching circuit 68 which provides an instantaneous turn-on signal to a transistorized power switch 70. Switch 70 in turn connects the power from the battery 54 to an output bus 72. Bus 72 powers, through a resistor 74, the oscillator 46 and all signal processing circuitry prior to it in the signal chain. The bus 72 also energizes a one-half second timer 76 as well as a control tone oscillator 78 to be described below along with an "on" indicator light emitting diode 80 (lamp 16). System turn on by switch 66 activates timer 76 for its half second on time to provide the control tone from oscillator 78 for that period. The receiver to be described interprets this as an indication to establish the network in a dialing state.

The deactivation of the latching circuit 68 by turning switch 66 "off" also provides a delay of approximately three to four seconds before the switch 70 is interrupted along with a three to four second pulse to the enable input of the control tone oscillator 78. Control tone oscillator 78 provides a 147 Hz output signal for the duration of the pulse applied to its enable input. This signal is applied through a port of the high-pass filter 36 enabling it to pass to the saturating amplifier 38 ultimately achieving narrowband FM modulation at that frequency of the series diodes 58.

The switch 66 includes a third, "momentary one" position (SIG) which starts the latch 68 deactivation cycle and activates the control tone oscillator 78 enable control producing a control tone for as long as the "momentary on" condition lasts or until unlatching of circuit 68. The control tone in turn modulates and is transmitted in infrared by the series diodes 58. In this manner, a control tone is provided by the "momentary on" position of switch 66, which is decoded by the receiver of the network station 12, as described below, to restore the dial tone on the telephone network whereby a series of pulses from the pulse dialer 62 can be sent over the telephone network. On the other hand, the three to four second enable signal from the latch 68 is a result of turning the switch 66 into the permanent "off" position and is decoded as an indication of the portable unit 10 going off-hook.

Figure 3:
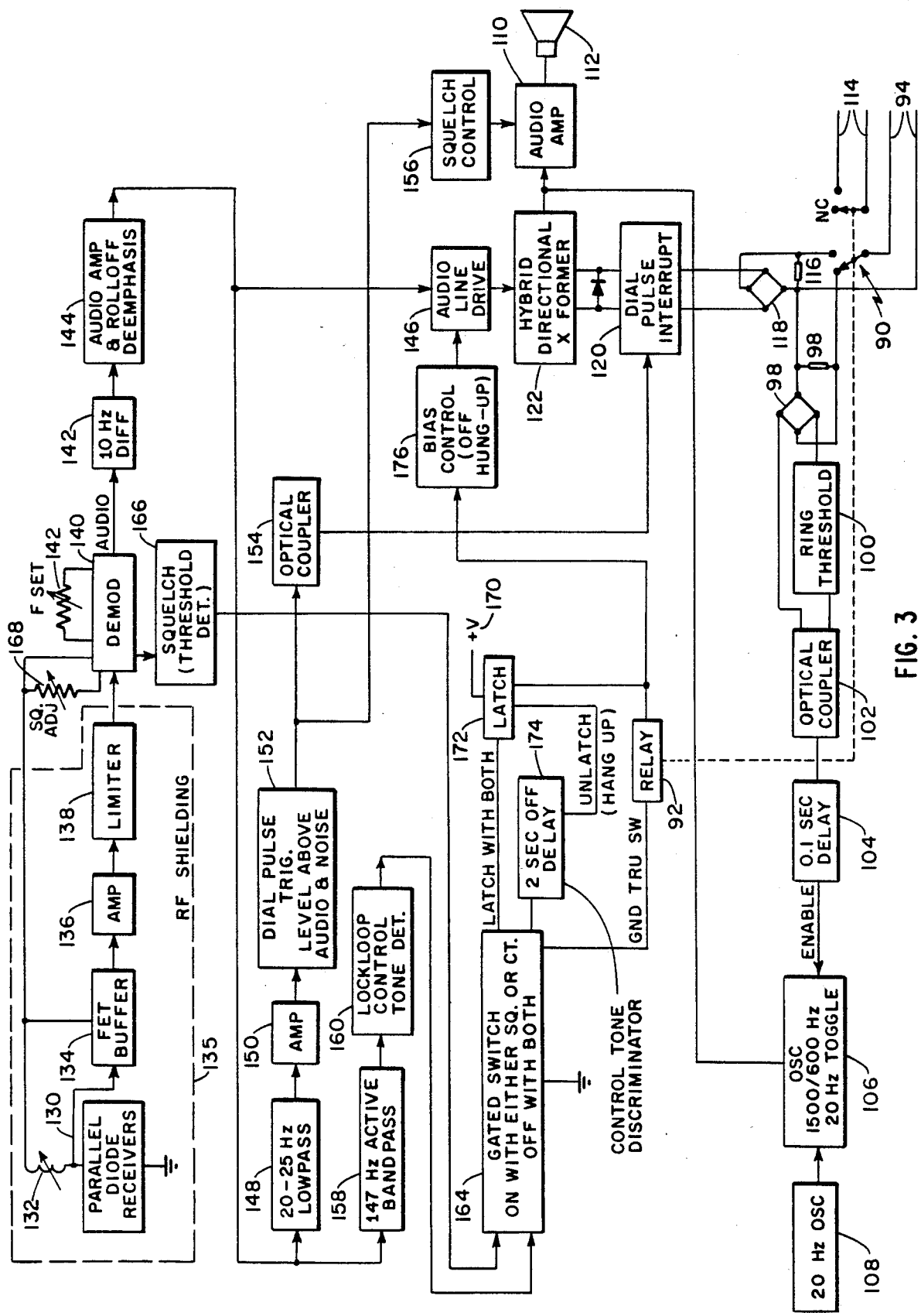
FIG. 3 is a circuit diagram of the base station unit of the present invention.

The receiver circuit is shown in FIG. 3 and includes (in the lower left) a connection through a switch 90 driven by a relay 92, to be described below, which in the normally closed position connects signal lines 94 of the telephone network across a surge arrestor 98, through a polarity correcting diode bridge 96, to a ring threshold detector 100. Detector 100 typically includes a Zener diode functioning to discriminate against low voltage voice signals in favor of higher voltage ring indicating signals. This signal is then applied through an optical coupler 102 to isolate the circuitry of the receiver from the telephone network lines. The optical coupler 102, in response to a valid ring indication signal, activates a 0.1 second delay circuit 104 to suppress further spurious signals. If the ring indication lasts for more than a tenth of a second, the delay circuit 104 provides an enable output to an oscillator 106 which is switched between 1500 and 600 Hz outputs at a 20 Hz rate by a 20 Hz oscillator 108. This toggled oscillator output is then applied through an audio amplifier 110 to a loudspeaker 112, corresponding to loudspeaker 24 in FIG. 1, to broadcast a ring signal to the region of the portable unit 10.

With the relay 92 in the opposite position, on/off-hook lines 114 of the telephone network are connected together to indicate an off-hook state while the signal lines 94 are applied, across a surge protector 116, to a diode polarity correcting bridge 118. A dial pulse interrupt circuit 120 responds to dial pulses decoded by the receiver, in a manner to be described below, and provides an open circuit across the polarity corrected lines from the diode bridge 118. In the absence of dial pulse signals these lines from the diode bridge 118 are applied to a hybrid directional transformer 122 permitting audio, typically voice signals, on the network lines 94 to be applied through the transformer 122 to the audio amplifier 110 and loudspeaker 112. Transformer 122 also provides a D.C. path to maintain the required current through lines 94.

Infrared emissions from portable unit 10 are received at the receiver of FIG. 3 by a set of parallel connected infrared responsive diodes 130 which are turned to resonance by an inductor 132 in parallel therewith. The diodes in combination with inductor 132 resonate at 143 kHz so that they are resonantly excited at every other cycle of their natural resonant frequency. Relatively frequent resonant excitation is desired to avoid the damping effect of ambient light on diodes 130. The resonant signal is applied to an FET buffer stage 134 and in turn to a 20 db amplifier stage 136. The output of the amplifier 136 is applied to a diode limiter 138 to prevent overloads from situations where portable unit 10 is very close to diodes 130. Typically the combination of he parallel diode receivers, the FET buffer stage 134, the amplifier 136, and the limiter 138 are contained within a radio frequency interference shield box 135 to avoid electrostatic pick-up.

The limited signal is applied to a demodulator 140, typically an integrated circuit module such as an SL6600 which amplifies at the RF frequency and demodulates about 143 kHz as a phase-locked loop. The variable resistor 142 permits setting of the correct center frequency of the demodulator 140. The audio output of the demodulator 140 is applied through a coupling capacitor 142 selected to act at 10 Hz as a differentiator for demodulated dialing pulses and otherwise to couple audio signals to an audio amplifier 144 which incorporates a rolloff de-emphasis to remove the pre-emphasis provided by the pre-emphasis circuit 32 in FIG. 2. The audio output of the amplifier 144 is applied through an audio signal line driver amplifier 146 through the hybrid directional transformer 122 to the telephone lines 94. The hybrid directional transformer 122 provides coupling from the line driver 146 to the phone lines avoiding coupling of those signals to amplifier 110. Transformer 122 minimizes coupling between incoming signals applied to amplifier 110 and outgoing signals.

The output of the audio amplifier 144 is also applied to a low-pass filter 148 with a cut-off frequency between 20 Hz and 25 Hz to pass dial pulse signals and exclude other audio signals. The dial pulses from the filter 148 are applied through an amplifier 150 to a dial pulse trigger circuit 152 which has a threshold for triggering above the audio and noise level of whatever signals pass through the lowpass filter 148 and amplifier 150. Triggering pulses from the dial pulse circuit 152, representative of dialing pulses, are applied through an optical coupler 154 to activate the dial pulse interrupt circuit 120. The optical coupling is provided in order to isolate the dial pulse circuitry from the telephone network line. The output of the dial pulse circuit 152 is also applied to a squelch control circuit 156 which disables the audio amplifier 110 to prevent any dial clicks from being heard through the loudspeaker 112.

The output of the audio amplifier 144 is also applied to an active band-pass filter 158 having its frequency centered at the 147 Hz frequency of the control tone. This filtered signal is applied to a control tone detector 160 operating as a phase-locked loop to provide a positive indication of the existence of the control tone which is in turn applied to a gated switch 164.

The demodulator 140, noted above, includes a threshold squelch detection circuit 166 which has an output representative of the presence of a signal of a predetermined level from the demodulator 140, the threshold level thereof being adjusted by a resistor 168. The output of the squelch circuit 166, representing the presence of a carrier FM signal of predetermined strength at the input of the demodulator 140, is also applied to the gated switch 164.

The gated switch 164 selectively connects to ground the low side of the relay 92. The high side of the relay 92 is connected to circuit operating voltage 170 through latch circuit 172. When both signals from the squelch circuit 166 and tone detector 160 are applied to the gated switch 164, repesenting detection of the control tone and of a carrier signal, the latch 172 is activated. At this time, however, the gated switch 164 is "off" interrupting the connection of the relay 92 through the switch to ground. Under these conditions the switch 90 is still in the normally closed position connecting the signal lines 94 to the ring indicating loop through the polarity correcting bridge 96. As indicated above, with respect to FIG. 2, the circuitry for generating the control tone is operative to provide the control tone either for an interval of one-half second at turn-on or momentary on or for an interval of three to four seconds at turn-off. A delay circuit 174 operates to detect the duration of the "off" state of the gated switch 164. The delay circuit 174 provides a delay of two seconds after which, if the gated switch is still in the "off" state, representing the presence of both input signals, it provides an unlatch signal to the latch circuit 172 disconnecting the system voltage from the relay 92. This effects a final turn-off of the receiver.

If on the other hand, the control tone lasts for less than two seconds, i.e., the one-half second denotation tone indicating a turn-on condition with dial link pulses about to be transmitted, the unlatch condition will not be entered but the gated switch 164, which includes an exclusive OR function, will detect the lack of one of the inputs, closing the connection from the low side of the relay 92 to ground. When this condition exists, the relay 92 switches switch 90 to the normally open position, connecting the network lines 94 through to the dial pulse interrupt circuit 120 for both applying incoming audio to the speaker 112 as well as permitting it to apply outgoing auido signals from the portable unit 10 to network 94.

The latch 172 requires both the control tone (turn-on or momentary on) and the squelch detect signal. The presence of the squelch detect signal, indicating that the portable unit 10 is not too remote for reliable dialing, is a necessary condition to initiate operation. It's disappearance after dialing is completed will not result in receiver shutdown because the reduced audio quality of the link will be apparent to the listener and can be corrected by moving unit 10 closer.

The latch 172 also controls a bias circuit 176 for the audio line driver 146. The bias control 176 normally biases the audio line driver 146 in an "off" condition representing the "hung up" or "off" condition of the portable unit 10, disconnecting signals to the hybrid directional transformer 122. Once the latch circuit 172 is activated in response to the presence of both the control tone and signal from the threshold detector 166, the bias control 176 is activated to provide normal biasing to the line driver permitting it to operate to apply signals through transformer 122 to lines 94 (after relay activation).

With the generation of the short duration control tone, the gated switch 164 in conjunction with relay 92 and latch 172 operates to convert the telephone network from the ring loop to the active signal translation mode for audio signals as well as pulse signals between the network 94 and the receiver of FIG. 3 as well as the transmitter of FIG. 2. The shorter control tone is generated each time the switch 66 is switched to the "momentarily on" condition. This briefly results in the presence of both signals at the gated switch 164, disconnecting the low side connection of the relay 92 to ground and thus briefly interrupting the on-hook/off-hook lines 114 and signal lines 94 to return the network status to the dial tone status permitting dialing out through the dial pulse interrupt circuit 120.

A longer control tone, three to four seconds, is generated when the switch 66 is turned off. This longer tone is detected by the two second delay circuit 174 unlatching the latch circuit 172 which both unbiases the audio line driver 146 and disconnects relay 92 permanently restoring the telephone network to the on-hook mode making unit 12 of FIG. 3 receptive to ring signals over the network.

The above described disclosure provides for an efficiently modulated infrared emission for remote signaling use in conjunction with complete network control to provide on- and off-hook control and network dialing functions all from a portable unit. The efficient modulating scheme permits long battery usage consistent with the emission power requirements for infrared sources. This specific example of a system for accomplishing these goals illustrated above is not to be conceived of as limiting, the true scope of the invention being as presented in the following claims.

What is claimed is:

1. A portable telephone network extension system comprising:
   a portable transmitting unit having:
   a plurality of series connected infared emitters positioned to emit in a pattern external of said transmitting unit;
   means for generating audio signals;
   means for providing FM low duty cycle pulses having a defined voltage amplitude of predetermined duration representative of said audio signals;
   means for switching current through an inductor solely in response to each low duty cycle pulse and for directing the switched current through said plurality of emitters at a voltage in excess of said defined voltage amplitude, directly subsequent to each low duty cycle pulse;
   telephone network coupled means including:
   means for receiving infrared emissions from said portable transmitting unit and for providing FM pulse demodulation thereof to receover said audio signals;
   means for applying said demodulated audio signals to said telephone network;
   means for receiving signals from said telephone network and broadcasting them to the region of said portable transmitting unit.

2. The portable telephone extension of claim 1 wherein said means for providing pulses includes means for narrow band FM pulse activation of said plurality of infrared emitters.

3. The portable telephone extension of claims 1 or 2 wherein said plurality of infrared emitters includes a plurality of infrared emitting diodes.

4. The portable telephone extension of claim 1 further including:
   means associated with said telephone network coupled means for detecting received and demodulated dial pulses and for applying said dial pulses to the telephone network.

5. The portable telephone network extension system of claim 1 wherein said means for providing FM pulses includes:
   an inductor serially connected with said plurality of infrared emitters:
   means for storing electrical energy as a current in said inductor; and
   means for switching said inductor current through said plurality of infrared emitters in FM modulated pulses characteristic of said audio signals.

6. A remote infrared signalling system comprising:
   means for generating infrared signals and a carrier signal;
   means for producing FM modulation by said information signals on said carrier signal;
   means for generating pulses of predetermined low duty cycle duration in response to the occurence of the cycles of the FM modulated carrier signal;
   means for inductively storing energy from an electric energy source of predetermined voltage in response to each low duty cycle pulse;
   a plurality of series connected infrared emitters operative to emit infrared radiation upon energization of said emitters; and
   switching means operative to apply said inductively stored energy through said plurality of infrared emitters.

7. The system of claim 6 wherein said plurality of infrared emitters includes a plurality of series connected infrared emitting diodes.

8. The system of claim 6 further including:
   means for receiving infrared signals from said emitters;
   means for resonating said receiving means at a multiple of the frequency of said carrier signal; and
   means for detecting said information signals from the received infrared signals.

* * * * *